US008752259B2

(12) United States Patent
Gori et al.

(10) Patent No.: US 8,752,259 B2
(45) Date of Patent: Jun. 17, 2014

(54) SPRING CLIP AND METHOD OF USE FOR INSTALLING RAILINGS

(75) Inventors: Michael Gori, Peckville, PA (US); Michael A. Dotsey, Pottstown, PA (US)

(73) Assignee: AZEK Building Products, Inc., Scranton, PA (US)

( * ) Notice: Subject to any disclaimer, the term of this patent is extended or adjusted under 35 U.S.C. 154(b) by 183 days.

(21) Appl. No.: 13/345,950

(22) Filed: Jan. 9, 2012

(65) Prior Publication Data

US 2013/0174406 A1   Jul. 11, 2013

(51) Int. Cl.
*B25B 27/00*   (2006.01)

(52) U.S. Cl.
USPC ............................................. 29/257; 29/270

(58) Field of Classification Search
USPC ......... 29/257, 247, 244, 270, 243.5, 238, 239
See application file for complete search history.

(56) References Cited

U.S. PATENT DOCUMENTS

| 3,921,686 | A | * | 11/1975 | Markey | 411/167 |
| 5,588,666 | A | * | 12/1996 | Numata | 280/728.2 |
| 6,010,289 | A | * | 1/2000 | DiStasio et al. | 411/174 |
| 6,854,946 | B2 | * | 2/2005 | Bauer | 411/523 |
| 7,467,767 | B2 | * | 12/2008 | Miles et al. | 248/74.1 |
| 2004/0037669 | A1 | * | 2/2004 | Bauer | 411/523 |
| 2004/0081537 | A1 | * | 4/2004 | Nishikawa | 411/437 |
| 2013/0174406 | A1 | * | 7/2013 | Gori et al. | 29/525.01 |

* cited by examiner

*Primary Examiner* — Lee D Wilson
(74) *Attorney, Agent, or Firm* — Buchanan Ingersoll & Rooney PC

(57) ABSTRACT

A spring clip that has a first portion and a second portion. The first portion has a base with at least one aperture and a resilient flange portion that extends away from and above the base and faces a first direction. The second portion has at least one tubular extension that extends through the at least one aperture of the first portion beyond the base and engages the first portion. The at least one tubular extension has an aperture such that the at least one aperture in the first portion and the aperture in a second portion have a common axis. In addition, the flange portion can be compressed from a first position to a second position over the base and when the flange portion will move toward the first position when it is released from the second position. An installation tool is provided for inserting the spring clip into a longitudinal cavity of a railing section.

13 Claims, 6 Drawing Sheets

SPRING CLIP AND METHOD OF USE FOR INSTALLING RAILINGS

BACKGROUND OF THE INVENTION

1. Field of the Invention

The present invention relates to improvements in fastener systems. More particularly the invention relates to a spring clip used in conjunction with railing systems.

2. Description of the Related Art

In many cases brackets and retainer systems are used as a replacement for or in addition to traditional fasteners such as screws and nails. Brackets and retainers allow for more options during construction and may even allow for simpler construction of many types of structures. Furthermore, newer building materials such as those formed from composite materials have increased the applicability of brackets and retainers.

Composite materials such as extruded plastic and PVC members have gathered attention because they can be formed a variety of shapes and sizes and have lower maintenance and simpler installation at a lower cost than traditional wood construction applications. Composite materials are nearly impervious to moisture and therefore will not rot or decay like natural wood. During the manufacture of these assemblies, composite materials can be tinted with dyes or other materials to provide a specific color to a component, thus removing the need for surface preparation and painting prior to or subsequent to installing the trim assembly.

One application of these composite materials is in railing systems. Composite railing systems can be formed in a variety of shapes and styles and can manufactured such that installation of a railing system can be undertaken by a novice. An example of such a railing system is a railing assembly provided in U.S. Pat. No. 6,702,259. U.S. Pat. No. 6,702,259 discloses a guard rail system that includes a handrail, a top retainer, and a bottom rail that may be manufactured through an extrusion process. The handrail/retainer combination forms an integrated rail section and may be combined with the bottom rail to form an aesthetically appealing railing for a deck, porch, or stairs.

Since these railing systems can be formed in a variety of shapes and sizes that were not previously available, traditional fasteners may not provide an efficient and secure mechanism for fastening such a railing system. Thus, there is a need for a fastener system that is easy to manufacture and install, and allows for installation of modern railing systems.

SUMMARY OF THE INVENTION

A spring clip is disclosed herein that comprises a first portion and a second portion. The first portion has a base with at least one aperture and a resilient flange portion that extends away from and above the base and faces a first direction. The second portion has at least one tubular extension that extends through the at least one aperture of the first portion beyond the base and engages the first portion. The at least one tubular extension has an aperture such that the at least one aperture in the first portion and the aperture in the at least one tubular extension of the second portion have a common axis. In addition, the flange portion can be compressed from a first position to a second position over the base and when released from the second position, the flange portion will move toward the first position.

In a preferred embodiment of the spring clip, an inner surface of the aperture defined within the at least one tubular extension of the spring clip has threads.

In another preferred embodiment of the spring clip, the at least one aperture of the first portion further comprises a notch.

In still another preferred embodiment of the spring clip, the first portion of the spring clip is formed from a piece of sheet metal.

In a further preferred embodiment of the spring clip, the flange portion of the first portion of the spring clip comprises a U shape.

In yet a further preferred embodiment of the spring clip, the second portion of the spring clip is formed as a casting.

In still a further preferred embodiment of the spring clip, the second portion of the spring clip is plastic.

In another preferred embodiment of the spring clip, the flange portion extends at an angle from the base of the first portion, wherein the angle is 60° or less relative to the base.

In still another preferred embodiment of the spring clip, the at least one aperture of the first portion comprises two apertures and the at least one tubular extension comprises two tubular extensions.

In a further preferred embodiment of the spring clip, an installation tool comprises a mouth portion and a handle portion. The mouth portion has a notch that is sized and configured to hold the spring clip in a second position and the at least one tubular extension extends through the notch and away from the mouth of the installation tool.

Further disclosed herein is a method of connecting a bracket to a tubular railing section having a longitudinal cavity using the spring clip disclosed herein.

The method requires creating at least one aperture in the tubular railing section that extends from an outside surface of the tubular railing section to the longitudinal cavity, placing the flange portion of the spring clip in the second position, and inserting the spring clip into the longitudinal cavity of the tubular railing section through an open end of the tubular railing section.

In addition, the method requires aligning the at least one tubular extension of the spring clip with at least one aperture in the longitudinal cavity of the tubular railing section such that the at least one tubular extension of the spring clip engages the at least one aperture in the longitudinal cavity and releasing the spring clip from the second position such that the flange contacts the longitudinal cavity of the tubular railing section and fixedly engages the spring clip within the longitudinal cavity of the tubular railing section.

In a preferred embodiment, the method requires that placing the spring clip into the second position comprises compressing the spring clip into the second position and inserting the spring clip into the mouth of a tubular installation tool. The mouth of the tubular installation tool has a notch and the spring clip is held while in the second position by the mouth of the installation tool. The at least one tubular extension of the second portion aligns with and is located within the notch of the mouth while the spring clip is in the second position.

In another preferred embodiment, the method requires that releasing the spring clip from the second position comprises removing the spring clip from the mouth of the tubular installation tool by moving the tubular installation tool in the first direction while the at least one tubular extension of the spring clip is engaged in the at least one aperture defined on the inner surface of the longitudinal cavity.

In still another preferred embodiment, the method requires aligning at least one aperture of a railing bracket with the at least one aperture on the outside surface of the tubular railing section and inserting at least one fastener through the at least one aperture in the railing bracket to the at least one tubular extension of the spring clip and fastening the railing bracket to the tubular railing section via the fastener.

Additionally disclosed herein is a kit for a spring clip system that comprises a plurality of spring clips and an installation tool.

In a preferred embodiment, the kit contains a plurality of railing brackets.

In another preferred embodiment, the kit requires at least one tubular railing section that is an extrusion.

Other details, objects, and advantages of the invention will become apparent as the following description of certain present preferred embodiments thereof proceeds.

BRIEF DESCRIPTION OF THE FIGURES

In the accompanying drawing we have shown certain present preferred embodiments of our spring clip in which.

DESCRIPTION OF THE PREFERRED EMBODIMENTS

Figure 1:
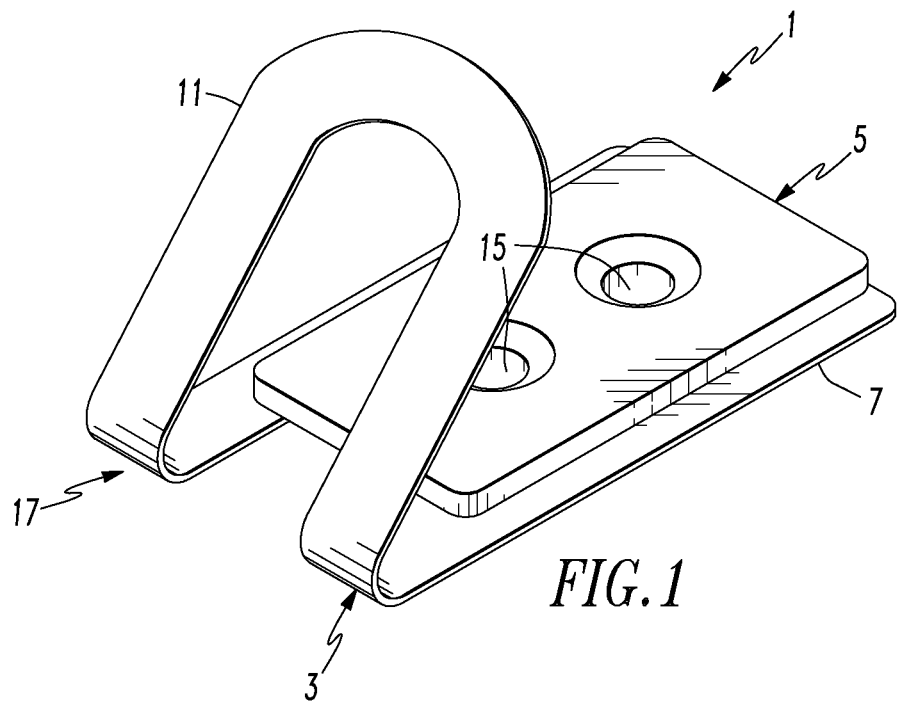
FIG. 1 is a front perspective view of a present preferred embodiment of our spring clip shown in the first position.
Figure 2:
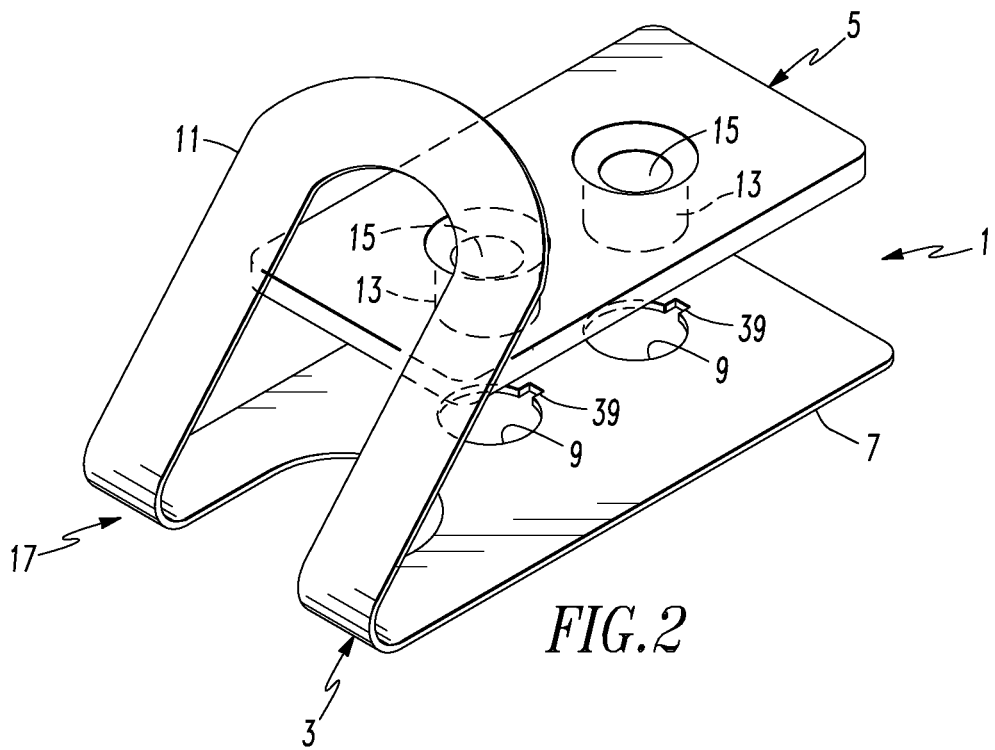
FIG. 2 is a front perspective view of the embodiment of our spring clip shown in FIG. 1 with the first portion and the second portion separated.

As shown in FIGS. 1-11, a spring clip 1 has a first portion 3 and a second portion 5. The first portion 3 has a base 7 with at least one aperture 9 and a resilient flange portion 11 that extends away from and above the base 7 and faces a first direction. The second portion 5 has at least one tubular extension 13 that extends through the at least one aperture 9 of the first portion beyond the base 7 and engages the first portion 3. The at least one aperture 9 of the first portion may comprise a notch 39 that allows the at least one aperture 9 to expand to better accommodate the at least one tubular extension 13 of the second portion 5.

In addition, the at least one tubular extension 13 has an aperture 15 such that the at least one aperture 9 in the first portion 3 and the aperture 15 in the second portion 3 have a common axis. An inner surface of the aperture 15 defined within the at least one tubular extension 13 of the spring clip may have threads. As shown in the embodiment of FIGS. 1-10, the first portion may have two apertures 9 and the second portion may have two corresponding tubular extensions 13. Further, the number of apertures 9 in the first portion 3 and the number tubular extensions 13 of the section portion 5 may be selected based on the desired application.

Figure 3:
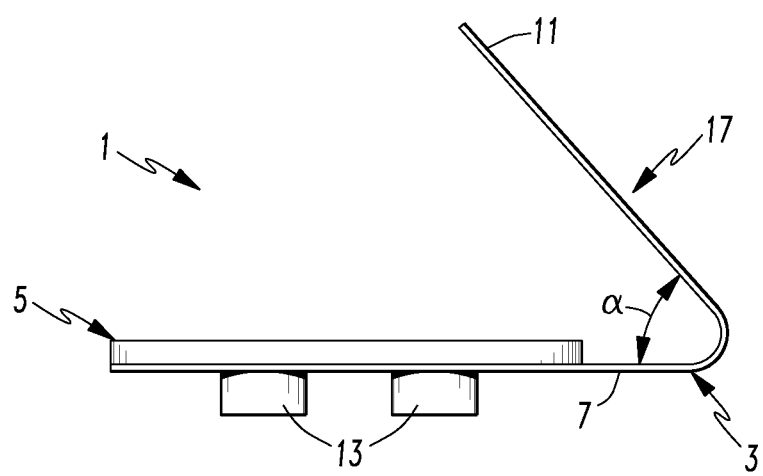
FIG. 3 is a side view of the embodiment of our spring clip shown in FIG. 1.
Figure 4:
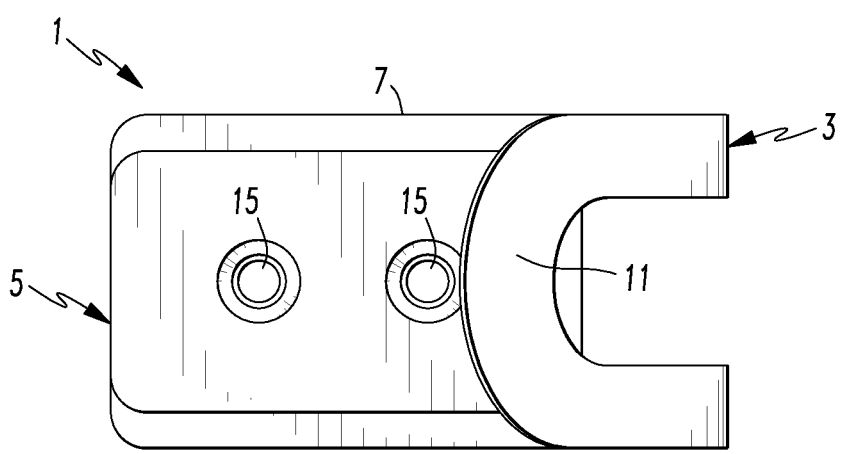
FIG. 4 is a top view of the embodiment of our spring clip shown in FIG. 1.
Figure 5:
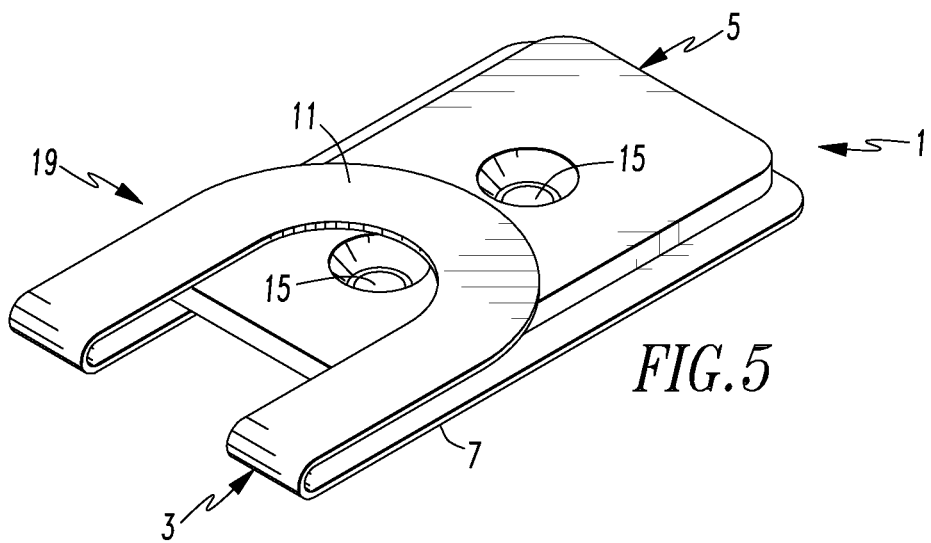
FIG. 5 is a front perspective view of the embodiment of our spring clip shown in FIG. 1 in a second position.
Figure 6:
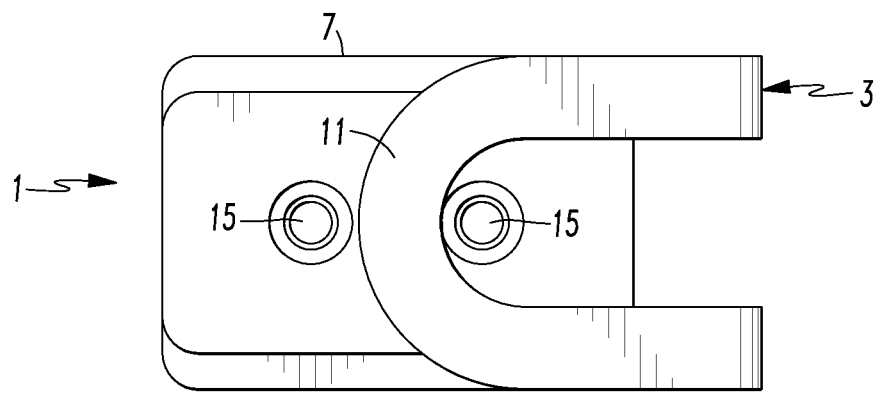
FIG. 6 is a top view of the embodiment of our spring clip shown in FIG. 1 in the second position.
Figure 7:
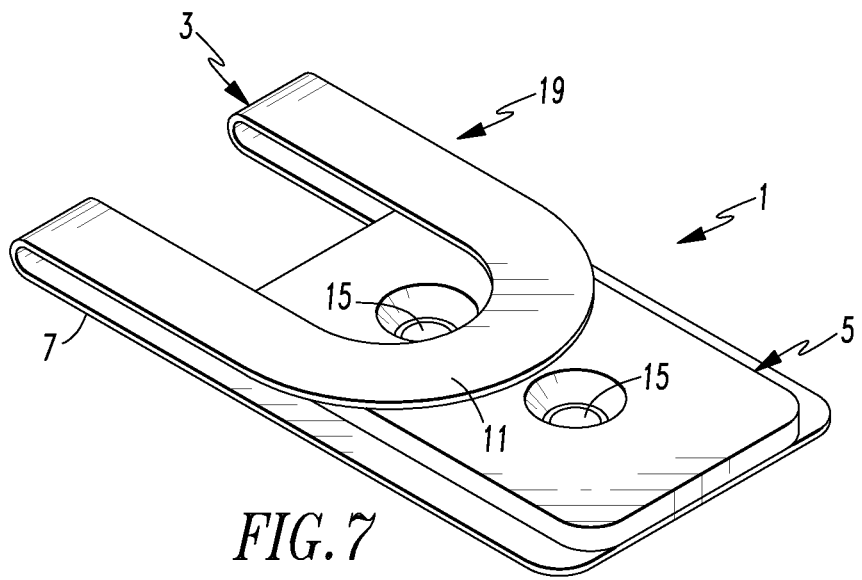
FIG. 7 is a rear perspective view of our spring clip shown in FIG. 1 in the second position.

Additionally, the flange portion 11 can be compressed from a first position 17 to a second position 19 over the base 7 such that when the flange portion 11 is released from the second position 19, the flange portion 11 will move toward the first position 17. In one embodiment, the flange portion 11 of the first portion 3 of the spring clip 1 may have a U-shape. The flange portion 11 extends at an angle α from the base 7 of the first portion 3, and as shown in FIG. 3, the angle α of the flange portion 11 may be 60° or less relative to the base 7.

Further, the first portion 3 of the spring clip 1 may be formed from a piece of sheet metal or any other suitable material that allows the flange portion 11 to be flexible in relation to the base 7. In addition, the second portion 5 of the spring clip 1 may be formed as a casting that is made from a suitable material, such as for example plastic, aluminum, resin, or fiberglass.

Figure 8:
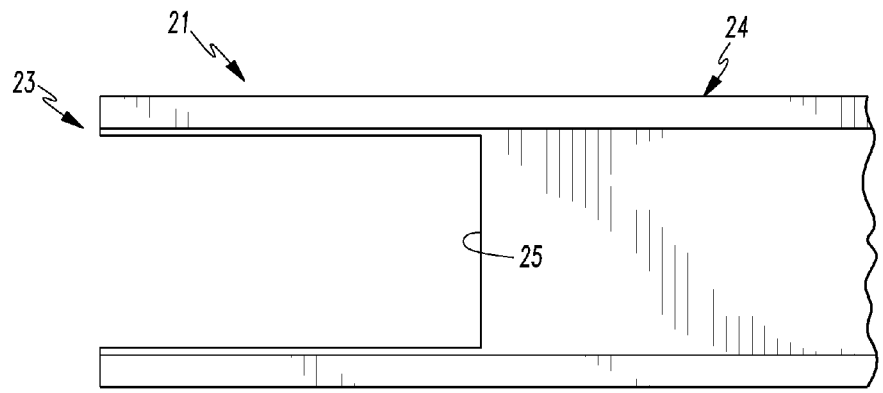
FIG. 8 is a top view of a present preferred embodiment of the installation tool that may be used with the spring clip.
Figure 9:
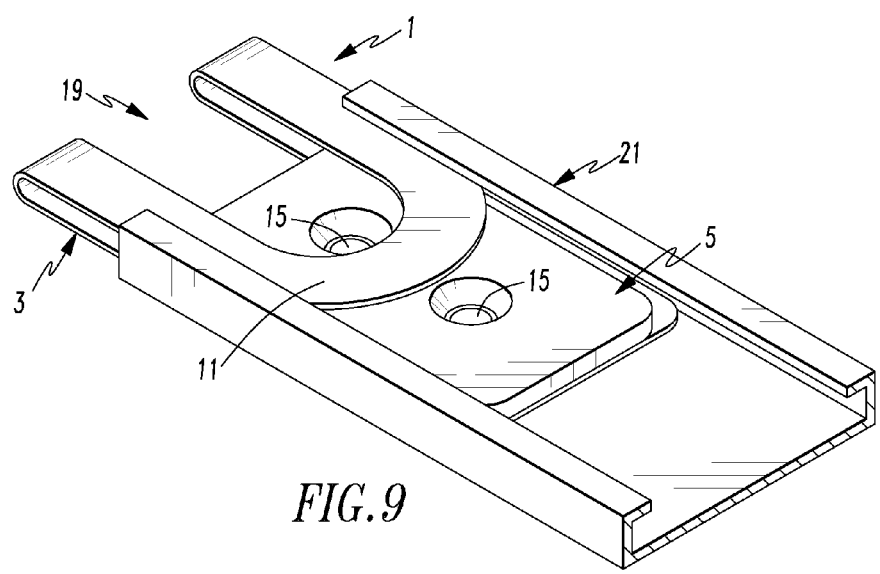
FIG. 9 a perspective view of our spring clip as shown in FIG. 1 located within the installation tool shown in FIG. 8.
Figure 10:
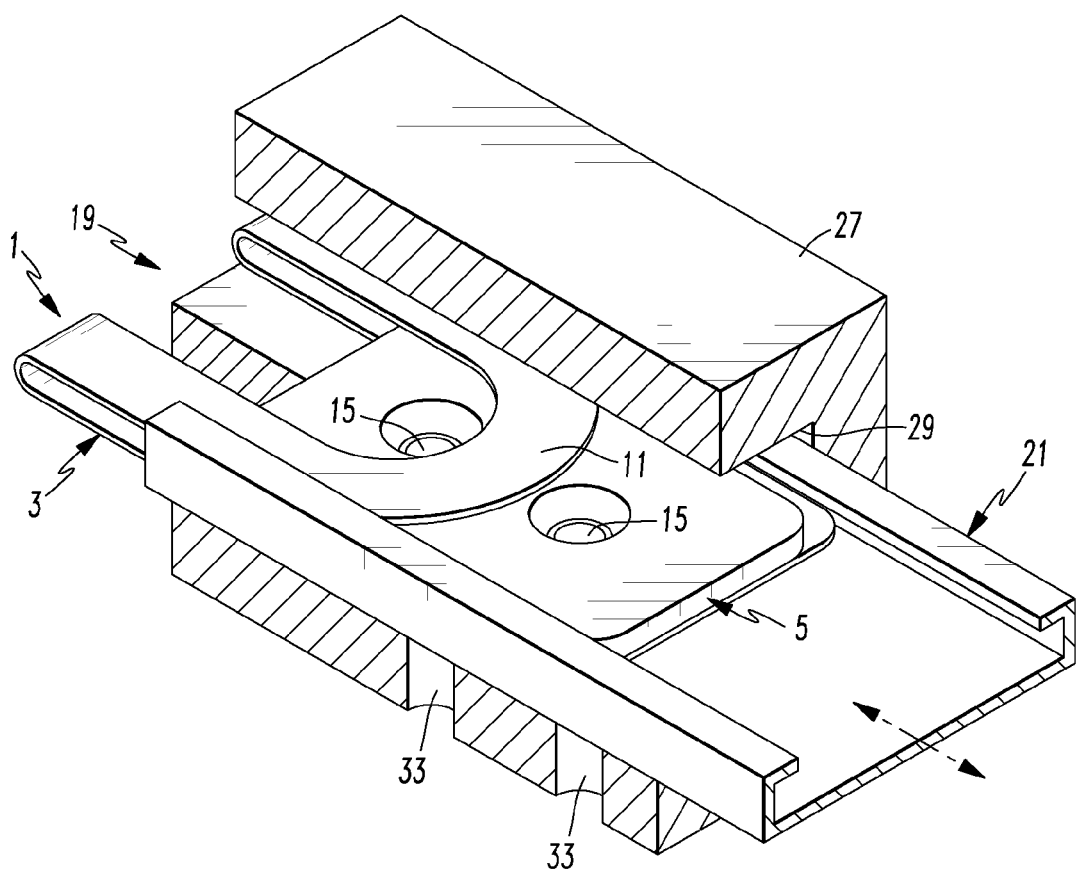
FIG. 10 is a perspective view of our spring clip as shown in FIG. 1 with the spring clip located within the installation tool shown in FIG. 8 and within a longitudinal cavity of a tubular railing section.

In addition, an installation tool 21 may be provided with the spring clip 1. As shown in FIGS. 8-10, the installation tool 21 comprises a mouth 23 and a handle portion 24. In the embodiment shown in FIGS. 8-10 the mouth 23 has a notch 25 and is sized and configured to hold the spring clip 1 while the spring clip is in the second position 19. The at least one tubular extension extends through the notch 25 and away from the mouth 23 of the installation tool 21. The installation tool 21 is shown as having a tubular configuration in FIGS. 8-10, however the installation tool may comprise a set of tongs or similar device for holding the spring clip 1 in the second position 19 so that it can be inserted into an appropriately sized space.

Figure 11:
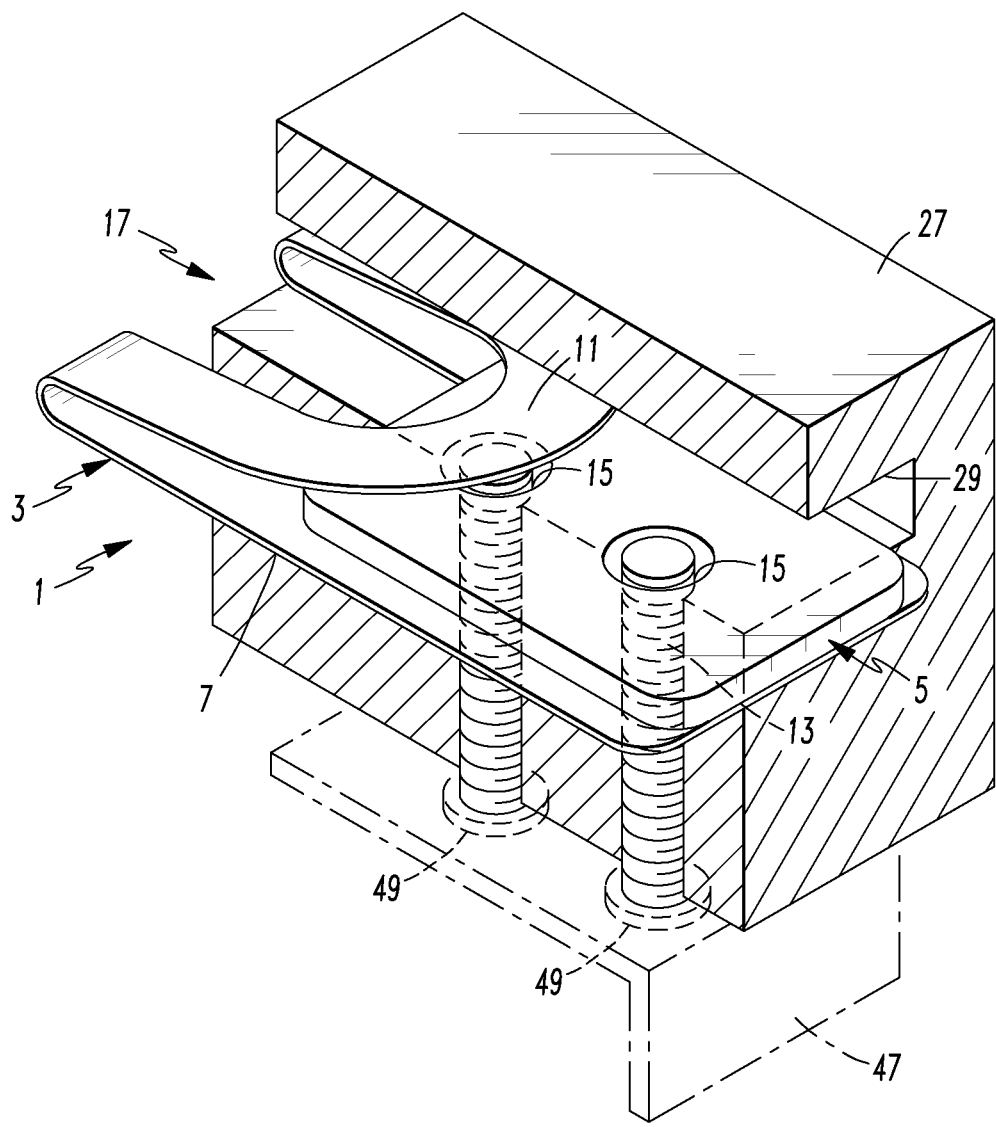
FIG. 11 is a perspective view similar to FIG. 10 showing our spring clip shown in FIG. 1 in the first position and placed within a longitudinal cavity of a tubular railing section.

Furthermore, the spring clip 1 may be used to connect a bracket to a tubular railing section 27 that has a longitudinal cavity 29 by inserting the spring clip 1 into the longitudinal cavity 29 as shown in FIGS. 9-11. The tubular railing section 27 may be a bottom rail section as provided in U.S. Pat. No. 6,702,259. Further, the tubular railing section 27 may be formed as an extrusion. At least one aperture 33 is created in the tubular railing section 27 that extends through an outside surface of the tubular railing section 27 to the longitudinal cavity 29. The spring clip 1 is placed in the second position 19 and is inserted into the longitudinal cavity 29 of the tubular railing section 27 through an open end of the tubular railing section 27 in a second direction that is generally opposite the first direction which the flange portion 11 faces. If the installation tool 21 is used, the spring clip 1 is compressed into the second position 19 and is inserted into the mouth 23 of the installation tool 21 such that the at least one tubular extension 13 is located in the notch 25 at the mouth 23. The installation tool 21 holds the spring clip 1 in the second position 19 while it is inserted into the longitudinal cavity 29 of the tubular railing section 27 in the first direction. The two-headed arrow shown in FIG. 10 illustrates the directions of insertion and removal of the installation tool within the cavity 29.

The at least one tubular extension 13 of the spring clip 1 is aligned with at least one aperture 33 in the longitudinal cavity 29 of the tubular railing section 27 such that the at least one tubular extension 13 of the spring clip 1 engages the at least one aperture 33 in the longitudinal cavity 29. This engagement holds the spring clip 1 in place while the installation tool is pulled out of the cavity 29, releasing the spring clip. Upon release, the flange portion 11 moves away from the base such that the flange portion 11 contacts the longitudinal cavity 29 of the tubular railing section 27 and fixedly engages the spring clip 1 within the longitudinal cavity 29 of the tubular railing section 27.

Although we prefer to use the installation tool 21 shown in FIGS. 8-10, a different installation tool can be used to insert the spring clip 1. Indeed, it may be possible to insert the spring clip 1 into some cavities manually without using a tool.

We anticipate that a railing bracket 47 will be attached to the railing section for attaching the end of the railing section to a wall or post. One aperture of that railing bracket 47 may be aligned with the at least one aperture 29 on the outside surface of the tubular railing section 27. The railing brackets 47 should have a corresponding number of apertures to match the number of tubular extensions of the spring clip. At least one fastener 49, such as a screw, may be inserted through the at least one aperture in the railing bracket 47 to the at least one tubular extension 13 of the spring clip 1 and the railing bracket may be fastened to the tubular railing section 13 via the fastener.

Furthermore the spring clip may be sold in a kit that includes a plurality of spring clips and the installation tool. The kit may also include a plurality of railing brackets. The railing brackets of the kit should have a corresponding number of apertures to match the tubular extension of the spring clip. In another embodiment, the kit may include at least one tubular railing section that is an extrusion.

While we have shown and described certain present preferred embodiments of our spring clip and have illustrated certain present preferred methods of making and using the same, it is to be distinctly understood that the invention is not limited thereto but may be otherwise variously embodied and practiced within the scope of the following claims.

We claim:

1. A spring clip comprising:
a first portion; and
a second portion; and
wherein the first portion having a base with at least one aperture and a resilient flange portion that extends away from and above the base and faces a first direction, the second portion having at least one tubular extension that extends through the at least one aperture of the first portion beyond the base and engages the first portion, the at least one tubular extension having an aperture such that the at least one aperture in the first portion and the aperture in the at least one tubular extension of the second portion have a common axis; and
wherein the flange portion can be compressed from a first position to a second position over the base and when released from the second position, the flange portion will move toward the first position.

2. The spring clip of claim 1 wherein an inner surface of the aperture defined within the at least one tubular extension of the spring clip has threads.

3. The spring clip of claim 1 wherein the at least one aperture of the first portion further comprises a notch.

4. The spring clip of claim 1 wherein the first portion of the spring clip is formed from a piece of sheet metal.

5. The spring clip of claim 1 wherein the flange portion of the first portion of the spring clip comprises a U shape.

6. The spring clip of claim 1 wherein the second portion of the spring clip is formed as a casting.

7. The spring clip of claim 1 wherein the second portion of the spring clip is plastic.

8. The spring clip of claim 1 wherein the flange portion extends at an angle from the base of the first portion, wherein the angle is 60° or less relative to the base.

9. The spring clip of claim 1 wherein the at least one aperture of the first portion comprises two apertures and the at least one tubular extension comprises two tubular extensions.

10. The spring clip of claim 1 further comprising an installation tool, the installation tool comprising a mouth portion and a handle portion, the mouth portion having a notch and being sized and configured to hold the spring clip in the second position and the at least one tubular extension extending through the notch and away from the mouth of the installation tool.

11. A kit for a spring clip system comprising:
a plurality of spring clips; and
an installation tool; and
wherein each spring clip has a first portion and a second portion, the first portion having a base with at least one aperture and a resilient flange portion that extends away from and above the base and faces a first direction, the second portion has at least one tubular extension that extends through the at least one aperture of the first portion beyond the base and engages the first portion; and
wherein the at least one tubular extension having an aperture such that the aperture in the first portion and the aperture in the second portion have a common axis; and
wherein the flange portion is compressible from a first position to a second position over the base such that when the flange portion is released from the second position, the flange portion will move toward the first position;
wherein the installation tool comprising a mouth portion and a handle portion, the mouth portion has a notch and is sized and configured to hold the spring clip in the second position such that the at least one tubular extension extends through the notch and away from the mouth of the installation tool.

12. The kit of claim 11 further comprising a plurality of railing brackets.

13. The kit of claim 12 further comprising at least one tubular railing section, wherein the at least one tubular railing section is an extrusion.

* * * * *